United States Patent
Pasumarthi et al.

(10) Patent No.: US 12,380,234 B2
(45) Date of Patent: Aug. 5, 2025

(54) DYNAMICALLY PROCESSING REQUESTS FOR DATA ITEMS BASED ON RESOURCE CONSTRAINTS

(71) Applicant: SAP SE, Walldorf (DE)

(72) Inventors: Suresh Pasumarthi, Bangalore (IN); Dilip Patidar, Bangalore (IN); Nandakumar Muthusamy, Bangalore (IN)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 18/145,082

(22) Filed: Dec. 22, 2022

(65) Prior Publication Data

US 2024/0211620 A1   Jun. 27, 2024

(51) Int. Cl.
*G06F 21/62* (2013.01)
*G06F 16/2457* (2019.01)
*G06F 16/28* (2019.01)

(52) U.S. Cl.
CPC .... *G06F 21/6227* (2013.01); *G06F 16/24578* (2019.01); *G06F 16/284* (2019.01); *G06F 2221/2113* (2013.01)

(58) Field of Classification Search
CPC .......... G06F 21/6227; G06F 16/24578; G06F 16/284; G06F 16/24569
USPC ....................................................... 707/748
See application file for complete search history.

(56) References Cited

U.S. PATENT DOCUMENTS

| | | | |
|---|---|---|---|
| 9,667,740 B2 | 5/2017 | Pasumarthi et al. | |
| 9,747,463 B2 | 8/2017 | Pasumarthi et al. | |
| 10,324,908 B2 | 6/2019 | Kumar et al. | |
| 2008/0010207 A1* | 1/2008 | Yanagihara | H04L 63/10 705/51 |
| 2018/0307723 A1* | 10/2018 | Bhargava | G06F 16/2457 |
| 2021/0374276 A1 | 12/2021 | Nayak et al. | |

OTHER PUBLICATIONS

Cong et al: "Data Pricing in Machine Learning Pipelines", arXiv:2108.07915v1 [cs.LG] Aug. 18, 2021 (Year: 2021).*

(Continued)

*Primary Examiner* — Kuen S Lu
(74) *Attorney, Agent, or Firm* — Fish & Richardson P.C.

(57) ABSTRACT

To dynamically process requests for data items based on resource constraints, a computer system receives data including identifiers identifying respective data items. The data includes authorization request to obtain the multiple items and source data identifying a source. The system identifies a resource constraint associated with each of the data items and determines an aggregate resource constraint. If the aggregate exceeds a threshold, the system determines a subset of the multiple items. If an aggregate associated with data items in the subset satisfies the threshold, the system generates a first subset of the identifiers identifying respective data items in the determined subset, generates a second subset of the identifiers identifying respective data items excluded from the determined subset, transmits the authorization request to obtain the data items in the first subset, and transmits the permission, the first subset and the second subset to the source identified by the source data.

20 Claims, 4 Drawing Sheets

(56) References Cited

OTHER PUBLICATIONS

Bhargava et al.: "Designing an Expert System for Online Shopping Cart Management", 978-1-5386-9346-9/19/$31.00 © 2019 IEEE (Year: 2019).*
Baumann et al.: "Every Byte Counts: Selective Prefetching for Mobile Applications", Jun. 2017 (Year: 2017).*
Papaioannou et al.: "Scalia: An Adaptive Scheme for Efficient Multi-Cloud Storage", SC12, Nov. 10-16, 2012, Salt Lake City, Utah, USA 978-1-4673-0806-9/12/$31.00 c 2012 IEEE (Year: 2012).*
Baumann et al., "Every byte counts: Selective prefetching for mobile applications." Proceedings of the ACM on Interactive, Mobile, Wearable and Ubiquitous Technologies 1.2, Jun. 2017, 29 pages.
Bhargava et al., "Designing an Expert System for Online Shopping Cart Management." 2019 Amity International Conference on Artificial Intelligence (AICAI). IEEE, Feb. 2019, 235-238.
Cong et al., "Data pricing in machine learning pipelines." Knowledge and Information Systems 64.6, May 2022, 1417-1455.
Extended European Search Report in European Appln. No. 23212869.4, mailed on May 16, 2024, 11 pages.
Papaioannou et al., "Scalia: An Adaptive Scheme for Efficient Multi-Cloud Storage" SC'12: Proceedings of the International Conference on High Performance Computing, Networking, Storage and Analysis. IEEE, Nov. 2012, 10 pages.

\* cited by examiner

DYNAMICALLY PROCESSING REQUESTS FOR DATA ITEMS BASED ON RESOURCE CONSTRAINTS

TECHNICAL FIELD

The present disclosure relates to computer-implemented methods, software and systems for dynamically processing requests for data items, for example, based on resource constraints.

SUMMARY

This specification describes technologies relating to dynamically processing requests for data items based on resource constraints.

Certain aspects of the subject matter described here can be implemented as a computer-implemented method. A computer system determines that an aggregate resource constraint associated with multiple data items received with an authorization request to obtain the multiple data items exceeds a threshold resource constraint. The authorization request includes source data identifying a source from which the authorization request was received. In response to determining that the aggregate resource constraint exceeds the threshold resource constraint, the computer system determines a subset of the multiple data items. The subset includes fewer data items than the multiple data items received with the authorization request. The computer system determines that an aggregate of the resource constraint associated with each data item in the subset satisfies the threshold resource constraint associated with obtaining data items. In response, the computer system generates a first unique identifier identifying a first subset. The computer system maps, to the first unique identifier, multiple identifiers identifying respective data items in the determined subset. The computer system generates a second unique identifier identifying a second subset. The computer maps, to the second unique identifier, identifiers identifying respective data items excluded from the determined subset. The computer system transmits the authorization request to an authorization engine requesting permission to obtain the multiple data items in the first subset. In response to receiving the permission, the computer system transmits, to the source identified by the source data: the permission, the first unique identifier generated for the first subset, the multiple identifiers mapped to the first unique identifier, the second unique identifier generated for the second subset, and the identifiers mapped to the second unique identifier.

An aspect combinable with any other aspect includes the following features. The data received through the user interface displayed on the display device includes multiple rankings associated with the respective multiple items. In response to determining that the aggregate resource constraint exceeds the threshold resource constraint, the computer system determines the subset of the multiple data items by selecting data items to include in the subset based, in part, on the multiple rankings associated with the respective multiple items.

An aspect combinable with any other aspect includes the following features. To select data items to include in the subset based, in part, on the multiple rankings associated with the respective multiple items, the computer system selects a data item with a higher ranking to include in the subset in place of another data item with a comparatively lower ranking.

An aspect combinable with any other aspect includes the following features. The computer system receives, through a user interface displayed on a display device, data including multiple identifiers identifying the respective multiple data items, the authorization request and the source data.

An aspect combinable with any other aspect includes the following features. The data received through the user interface displayed on the display device includes multiple quantities associated with the respective multiple items. In response to determining that the aggregate resource constraint exceeds the threshold resource constraint, to determine the subset of the multiple data items, the computer system reduces a quantity of a data item and then selects the data item associated with the reduced quantity to include in the subset.

An aspect combinable with any other aspect includes the following features. In response to determining that the aggregate resource constraint determined for the multiple data items exceeds the threshold resource constraint associated with obtaining data items, the computer system identifies a first data item from the multiple data items. The first data item is associated with a first resource constraint. The computer system determines, from a database of data items, an equivalent data item having substantially similar characteristics as the first data item. The equivalent data item has a reduced resource constraint compared to the first resource constraint. The computer system determines an identifier that identifies the equivalent data item. The computer system provides, to the source, the identifier of the equivalent data item as an alternative to the first data item.

An aspect combinable with any other aspect includes the following features. In response to transmitting the authorization request to the authorization engine requesting permission to obtain the multiple data items in the first subset, the computer system receives, from the authorization engine, permission to obtain only the multiple data items in the first subset and not the multiple data items in the second subset.

An aspect combinable with any other aspect includes the following features. The source data identifying the source from which the authorization request was received includes a past history of requests to obtain data items from the source. To generate the first subset of the multiple identifiers, the computer system generates the first subset of the multiple identifiers based, in part, on the past history of requests from the source.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

In an enterprise that operates across multiple divisions, user requests for items are processed by a common division, e.g., a purchase department. An example operation to submit, using an enterprise computer system, such a request to the purchase department can include the following. A display device of a computer system that is connected to the enterprise computer system (and specifically to the purchase department computer system) can execute a computer application (e.g., a shopping cart), which can display a user interface on the display device of the computer system. A user of the computer system can select a data item representing an item that the user needs to perform the user's assigned role in the enterprise. In response to the user submitting the request for the data item, an identifier (e.g., a unique ID) associated with the item is transmitted to the purchase department computer system along with data identifying the source (i.e., the user) who placed the request.

Purchase departments operate under resource constraints, e.g., costs based a monetary budget. The purchase department computer system stores, e.g., in a database, threshold resource constraints (e.g., a budget or a maximum allowable or available cost) associated with multiple data items that enterprise users can request or have requested in the past. In other words, the purchase department computer system stores a maximum budget available for the user or for the data item requested by the user. In response to receiving the request from the user, the purchase department computer system identifies, from the database, the threshold resource constraint (i.e., the budget) for the requested item. The purchase department computer system also identifies, e.g., from an external database (such as a vendor database), a resource needed to obtain the requested item (i.e., the cost of the item). If the purchase department computer system determines that the resource constraint (i.e., cost) needed to obtain the item is less than the threshold resource constraint (i.e., budget) associated with the item, then the purchase department computer system can process the request, e.g., by sending the request for approval. On the other hand, if the purchase department computer system determines that the resource constraint needed to obtain the item is more than the threshold resource constraint associated with the item, then the purchase department computer system may be unable to process the request.

This disclosure describes techniques to process, at least partially, a request to obtain multiple data items, where resource constraints do not permit processing all of the requested data items. Implementing the techniques described here can notify users of data items that can be obtained and those that cannot be obtained due to the resource constraints, thereby improving transparency of the operations. Rather than statically managing all requests to obtain data items in the same manner, the techniques described here can dynamically change the manner in which an individual request is managed based on specifics associated with the request.

Implementing the techniques described here can also streamline usage of computer resources. For example, purchase department computer systems receive multiple requests from multiple users, each request requesting one or more data items. When a request cannot be processed due to resource constraints, computational resources of the purchase department computer systems are spent resolving the resulting error. Implementing the techniques described here can eliminate such errors, thereby freeing the computational resources, making such freed resources available for other computational operations in the enterprise. As a result, overall speed of performance and efficiency of the purchase department computer systems and, in turn, the enterprise computer systems, can be streamlined and improved.

Figure 1:
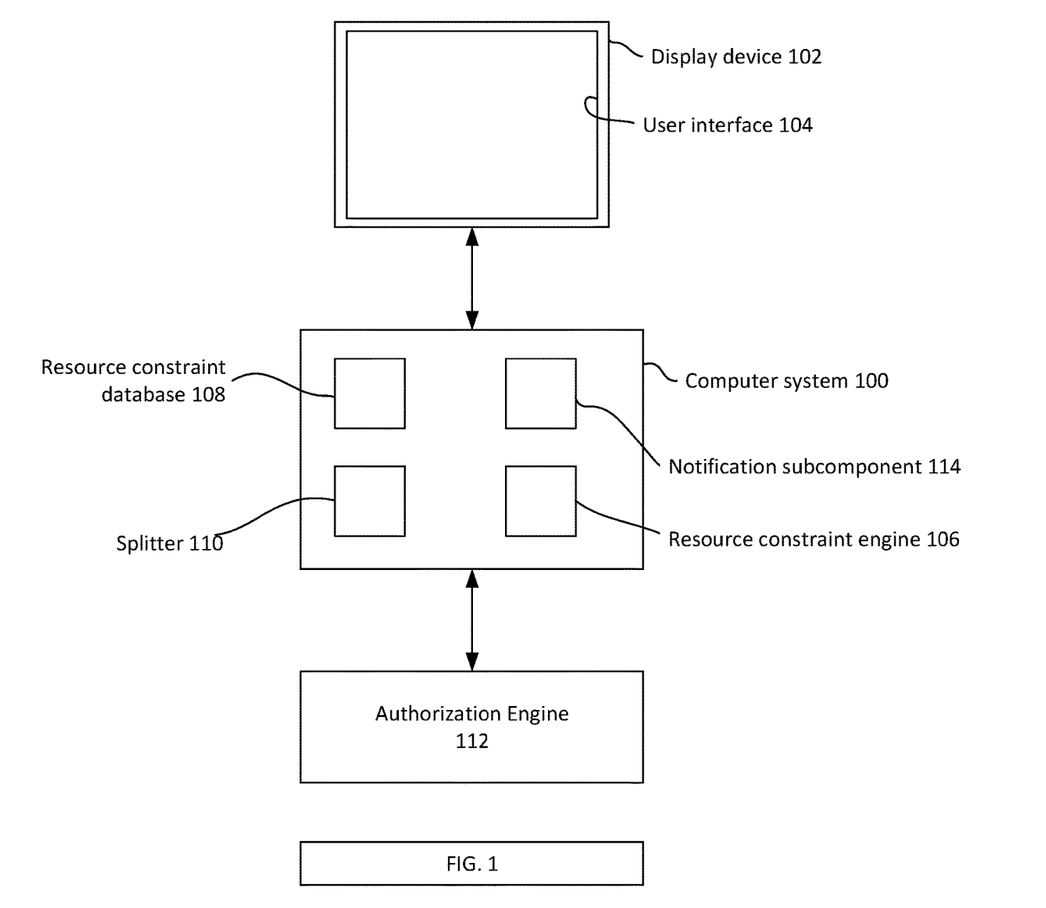
FIG. 1 is a schematic diagram of an example of a computer system to dynamically process requests for data items based on resource constraints.

FIG. 1 is a schematic diagram of an example of a computer system 100 to dynamically process requests for data items based on resource constraints. The computer system 100 can be implemented as one or more computers (e.g., one or more processors) and a computer-readable medium (e.g., a non-transitory computer-readable medium). The computer-readable medium can store computer instructions executable by the one or more computers to cause the computer system 100 to perform operations described here. In some implementations, the computer system 100 can be or be part of a purchasing department computer system of an enterprise. As described below, the computer system 100 includes or is operatively connected to other computational entities, e.g., engines, components, sub-components, and the like, either directly or over one or more data networks. Each entity described here can be implemented similarly to the computer system 100.

In some implementations, the computer system 100 receives a data from a user computer system that includes a display device 102 in which a user interface 104 is displayed. Through the user interface 104, the user can provide, to the computer system 100, multiple data items that the user seeks to obtain. In some implementations, the user interface 104 can be deployed as an e-shopping cart to which the user can "add" data items. In some implementations, the user interface 104 can be deployed as just an electronic mail in which the user describes the data items that the users seeks to obtain. After identifying the multiple data items in the user interface 104, the user computer system can transmit the multiple data items to the computer system 100. In some implementations, each requested data item is associated with a respective identifier (e.g., a UID) using which the data item is referenced in a database of data items. The data received from the user interface can include multiple identifiers identifying respective multiple data items that the user identified in the user interface 104.

Also included in the data that the computer system 100 receives, is an authorization request to obtain the multiple data items identified by the multiple identifiers. In some implementations, a receipt of the multiple identifiers can automatically include the authorization request. Only if the authorization request is granted can a request for the data items be transmitted to a vendor computer system (not shown) outside the enterprise. The data that the computer system 100 receives can also include source data identifying a source from which the authorization request was received. For example, the source can be the personal identity of the user who transmitted the request to the computer system 100. In some implementations, source data can include a role assigned to the user in the enterprise. Source data can also include a user identifier using which the computer system 100 can access a history of past requests from the user. In some implementations, the data received from the user computer system can include a specific outside vendor from whom the data items can be procured.

In some implementations, after receiving the data from the user computer system, the computer system 100 identifies a resource constraint associated with each data item of the multiple items received from the user computer system. A resource constraint is a quantity of resources that the purchase department must expend to obtain the requested data item. For example, the resource constraint is a cost associated with the data item. The cost can be obtained from an external vendor from which the requested data item can be obtained. In some implementations, the data received from the user computer system can specify the external vendor. In some implementations, the computer system 100 can store a list of external vendors from whom data items can be obtained. In some implementations, the data received from the user computer system can include a resource constraint (e.g., a cost) associated with each data item, as provided by the user requesting the data item.

In some implementations, the computer system 100 includes (or is operatively connected to) a resource constraint engine 106 that identifies resource constraints associated with all of the multiple data items. The computer system 106 transmits the multiple identifiers received from the user computer system to the resource constraint engine 106. Using stored data received from external vendors or by accessing external vendor databases or using resource constraint received from the user computer system, the computer system 106 identifies a resource constraint associated with each data item.

Next, the computer system 100 determines an aggregate resource constraint representing an aggregation (e.g., a summation or other mathematical combination) of the resource constraint identified for each data item of the multiple data items. For example, the computer system 100 can add the identified costs for all of the data items to determine a total cost of all the requested items.

Subsequently, the computer system 100 determines a threshold resource constraint (e.g., budget) associated with the multiple data items. To do so, in some implementations, the computer system 100 includes (or is operatively connected to) a resource constraint database 108 that stores a mapping of identifiers associated with data items to threshold resource constraints associated with data items. By referencing the resource constraint database 108, the resource constraint engine 106 identifies a threshold resource constraint, e.g., a budget, associated with each data item received from the user computer system. By a summation of the identified threshold resource constraints for the multiple items, the computer system 100 determines a threshold resource constraint associated with obtaining the data items.

Subsequently, the computer system 100 compares the aggregate resource constraint with the threshold resource constraint associated with obtaining the data items. If the aggregate resource constraint exceeds the threshold resource constraint, then the conclusion is that sufficient budget is unavailable to cover the costs of all the requested data items.

In response to determining that the aggregate resource constraint exceeds the threshold resource constraint, the computer system 100 implements the following. The computer system 100 splits the requested data items into two groups—a first group including data items that can be obtained while satisfying the threshold resource constraints for the data items in the first group, and a second group including remaining data items. In some implementations, the computer system 100 includes (or is operatively connected to) a splitter 110 that is configured to split the requested data items into two groups.

For example, using the multiple identifiers of the multiple data items, the splitter 110 dynamically generates two subsets into which the splitter 110 divides the multiple data items. Each subset includes fewer than all of the multiple data items. The splitter 110 adds a data item to the first subset, determines an aggregate resource constraint for all data items in the first subset, and compares the aggregate resource constraint against the threshold resource constraint for obtaining all of the multiple data items. The splitter 110 repeats this process until the aggregate resource constraint of data items in the first subset exceeds the threshold resource constraint for obtaining all of the multiple data items. Then, the splitter 110 removes one of the data items added to the first subset so that the aggregate resource constraint of data items in the first subset satisfies the threshold resource constraint. The splitter 110 adds to the second subset, identifiers of data items not added to the first subset.

Figure 2:
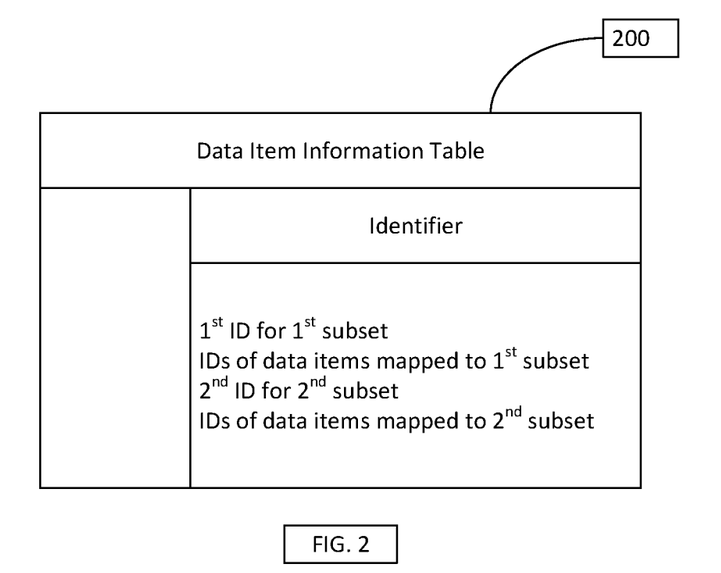
FIG. 2 is a schematic of an example table including identifiers identifying subsets and data items mapped to the subsets.

FIG. 2 is a schematic of an example table 200 including identifiers identifying subsets and identifiers identifying data items. As described below, identifiers identifying certain data items are mapped to an identifier identifying a subset. The table 200 includes a first identifier identifying a first subset of certain data items. Identifiers identifying those data items are mapped to the first identifier identifying the first subset. As described below, obtaining the data items in the first subset satisfies a threshold resource constraint. The table 200 also includes a second identifier identifying a second subset of data items, which were excluded from the first subset. Identifiers identifying the excluded data items are mapped to the second identifier identifying the second subset. As described below, obtaining the data items in the first subset alone would satisfy the threshold resource constraint, whereas obtaining the data items in second subset together with the data items in the first subset would exceed the threshold resource constraint.

In some implementations, the splitter 110 generates a first unique identifier identifying the first subset. For a first data item of the multiple data items, the splitter 110 determines if adding the data item to the first subset would satisfy or exceed the threshold resource constraint. For example, the splitter 110 compares the resource constraint associated with the first data item with the threshold resource constraint. If the splitter 110 determines that the threshold resource constraint will remain satisfied (e.g., the resource constraint associated with the first data item shall not exceed the threshold resource constraint), then the splitter 110 maps an identifier identifying the first data item to the first unique identifier identifying the first subset. On the other hand, if the splitter 110 determines that the threshold resource constraint will not be satisfied (e.g., the resource constraint associated with the first data item shall exceed the threshold resource constraint), then the splitter 110 does not map the identifier identifying the first data item to the first unique identifier identifying the first subset.

The splitter 110 repeats this process for a second data item. In particular, the splitter 110 determines an aggregate resource constraint by aggregating a resource constraint associated with the second data item with resource constraints of any other data items whose identifiers have already been mapped to the first subset. The splitter 110 compares the aggregate resource constraint with the threshold resource constraint. If the splitter 110 determines that the threshold resource constraint will remain satisfied, the splitter 110 maps an identifier identifying the second data item to the first unique identifier identifying the first subset.

The splitter 110 repeats the process described with reference to the second data item to each remaining data item. By doing so, the splitter 110 identifies all data items that can be obtained without exceeding the threshold resource constraint, and maps identifiers identifying all such items to the first unique identifier identifying the first subset.

As more and more identifiers identifying data items are mapped to the first unique identifier identifying the first dataset, the threshold resource constraint can be exceeded. Thus, certain data items remain that cannot be included in the first subset. The splitter 110 maps identifiers identifying such remaining data items to a second unique identifier identifying the second subset. Due to resource constraints, data items in the second subset cannot be procured. Alternatively or in addition, the likelihood is low that approval to obtain data items in the second subset will be granted. In such instances, the splitter 110 assigns a "Draft" status to the data items in the second subset. For example, the splitter 110 designates each data item in the second subset to be obtained in the next instance of obtaining data items, e.g., when additional resources become available.

At this point, the authorization request to obtain the items in the first subset can be approved while satisfying the threshold resource constraint. In contrast, the authorization request to obtain the items in both the first and second subsets cannot be approved. The computer system 100 is operatively connected to an authorization engine 112 that is configured to authorize or deny requests for data items. As described earlier, the computer system 100 has split the requested data items into a first subset that has been determined to include data items that satisfy the threshold resource constraint, and a second subset that has remaining data items. Consequently, the computer system 100 can forward only the first subset to the authorization engine 112 with a high confidence that the request will be approved. The computer system 100 receives the approval from the authorization engine 112. In some implementations, the computer system 100 includes a notification component 114 that communicates the approval (i.e., the permission to obtain items in the first subset), the first subset and the second subset to the source identified by the source data. For example, the computer system 100 transmits the permission, the first unique identifier generated for the first subset, the multiple identifiers mapped to the first unique identifier, the second unique identifier generated for the second subset, and the identifiers mapped to the second unique identifier. In particular, the computer system 100 transmits this data for display in the user interface 104 displayed on the display device 102.

In some implementations, the notification component 114 transmits this information to be displayed in the user interface 104 of the user computer system. The notification component 114 further identifies the second identifier identifying the second subset and the identifiers mapped to the second identifier as being automatically available for inclusion in the next instance of obtaining data items. In such implementations, the computer system 100 automatically includes the data items in the second subset among the data items to be obtained. In the next instance of obtaining data items, the computer system 100 automatically includes the data items in the second subset in the resource constraint determination described above.

Figure 3:
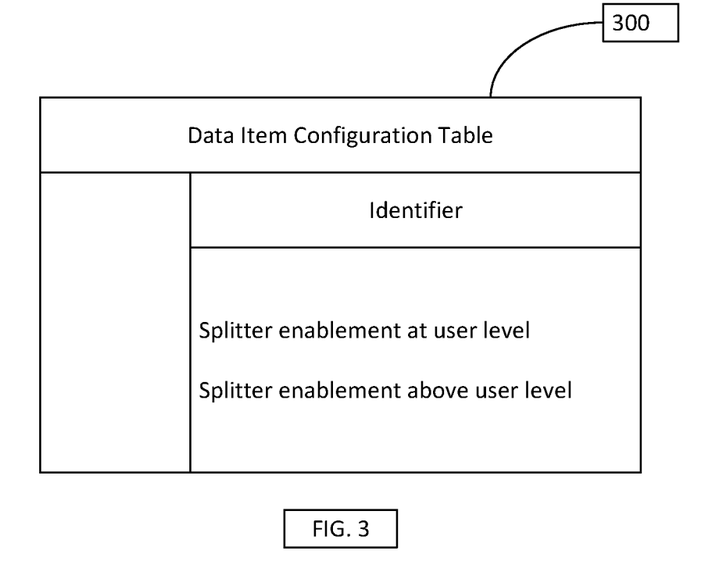
FIG. 3 is a schematic of an example table including configurations for a splitter that dynamically processes requests for data items based on resource constraints.

FIG. 3 is a schematic of an example table 300 including configurations for a splitter 110 that dynamically processes requests for data items based on resource constraints. In the table 300, the splitter 110 stores configurations identifying roles that have authority to split the data items into subsets as described earlier. For example, the table 300 can store the role of a user who selects data items to be obtained. Alternatively or in addition, the table 300 can store the role of an administrator, who is hierarchically at a level above or different from the user. For example, in response to the splitter 110 determining a failure to satisfy a threshold resource constraint, the splitter 110 can identify, from the table 300, a role with an authorization to split the multiple data items into subsets.

In some implementations, the computer system 100 (e.g., the splitter 110) can dynamically modify the data items that are added to the first subset. For example, the data received from the user computer system can include a multiple rankings associated with the respective multiple items. Each ranking represents a priority set by the user to a data item and represents how important the data item is to the user. When determining the data items to include in the first subset, the computer system 100 can select data items based on the ranking associated with the data item. For example, if the computer system 100 determines that a first item has a lower resource constraint compared to a second item, but the second item has a greater ranking than the first item, then the computer system 100 can prioritize adding the second item to the first subset over adding the first item. The computer system 100 can add the second item to the second subset.

In another example, the data received from the user computer system can include a quantity associated with each of the respective multiple items. For a particular data item, the computer system 100 can determine that reducing the associated quantity can allow the data item to be included in the first subset. In response, the computer system 100 can dynamically decrease the quantity of the data item and add the reduced quantity of the data item to the first subset. The computer system 100 can add a remaining quantity of the data item to the second subset.

In another example, the data received from the user computer system can include characteristics of the respective multiple items. Alternatively, the computer system 100 can obtain characteristics of the respective multiple items from an internal database (not shown) or from an external vendor database. In response to determining that a requested data item cannot be added to the first subset, the computer system 100 can dynamically check the internal database or the external vendor database for an equivalent data item with substantially similar characteristics but with a reduced resource constraint. The computer system 100 can either automatically replace the requested data item with the equivalent data item and add the equivalent data item to the first subset, or the computer system 100 can request permission from the user to obtain the equivalent data item in place of (i.e., as an alternative to) the requested data item. To do so, the computer system 100 can identify an identifier associated with the equivalent data item and either add the identifier to the first subset or provide the identifier to the user. In some implementations, the computer system 100 can add the requested data item to the second subset.

In a further example, the data received from the user computer system can include a past history of requests from the same source to obtain data items. In this example, the computer system 100 can receive two separate requests for data items from two different sources, e.g., two different users. Upon determining the aggregate resource constraint and threshold resource constraint for each source, the computer system 100 can determine that only some of the data items can be requested for each source. That is, the computer system 100 can determine a low confidence that the authorization engine 112 will grant approval for all data items requested by both sources. In response, the computer system 100 can evaluate the past history for each source to determine, for example, if a first source has historically requested more items compared to a second source. If yes, then the computer system 100 can dynamically prioritize the second source over the first source. To do so, the computer system 100 can increase threshold resource constraints for the second source and include more data items requested by the second source to the first subset. The computer system 100 include data items requested by the first source to the second subset.

In some implementations, the data received from the user computer system can include an identifier identifying an entity that can grant authorization of the request from the user computer system. In such implementations, the computer system 100 can be configured to route the authorization request to the identified entity. In some situations, the entity that can grant authorization may have changed unbeknownst to the user. In such situations, the computer system 100 can identify, from the authorization engine 112, the new entity that can grant authorization, and update the data received from the user computer system with the new entity. The computer system 100 can then transmit the identity of the new entity to the user.

In some implementations, the computer system 100 can store requests received for a duration (e.g., the past week or the past two weeks or the past month). When the computer system 100 receives a new request, the computer system 100 can compare if data items requested by a source in the new request were previously included in any stored requests received from the same source. By doing so, the computer system 100 can identify duplicate requests. Upon identifying a duplicate request, the computer system 100 can automatically cancel the request and notify the source of the reason for cancellation.

In some implementations, the computer system 100 can determine whether to add a data item to the first subset based on a hierarchical role of the source from which the request for the data item is received. For example, the data received from the user computer system can include the hierarchical role of the source (e.g., CEO, Director, Senior Manager, Independent Contractor). When the computer system 100 receives two requests for the same data item from two different sources and determines that threshold resource constraints permit obtaining approval for only one of the two requests, then the computer system 100 can compare the hierarchical roles received with the two requests. The computer system 100 can determine to satisfy the request of the user with the higher hierarchical role.

In some implementations, the splitter 110 can split the requested data item into more than two groups. The first group can include data items determined, as described above, as satisfying the resource constraint to obtain the items in the first group. A second group can include data items determined, as described above, as not satisfying the resource constraint to obtain the items in the second group. Nevertheless, for certain reasons (e.g., a ranking associated with the items or a hierarchical position of the source that requested the items), it may be important to obtain (or attempt to obtain) items in the second group. The computer system 100 can request special permission from the authorization engine 112 for items in the second group. For example, the computer system 100 can send the data items in the second group to the authorization engine 112 with data identifying the reasons for obtaining the items. The authorization engine 112 can determine whether or not to grant permission based on the reasons. A third group can include data items determined, as described above, as not satisfying the resource constraint and that will be saved for obtaining in a subsequent cycle.

The operations implemented by the splitter 110 are automatic and implemented both without additional user intervention as well as seamlessly without a stoppage in the workflow. By avoiding the need for user intervention, computer resources are better utilized and computer operations are optimized. By implementing the operations seamlessly without a stoppage in the workflow, time to perform the computer operations described here is reduced, which not only speeds up computer operations but also further optimizes computer resources needed to perform those operations.

Figure 4:
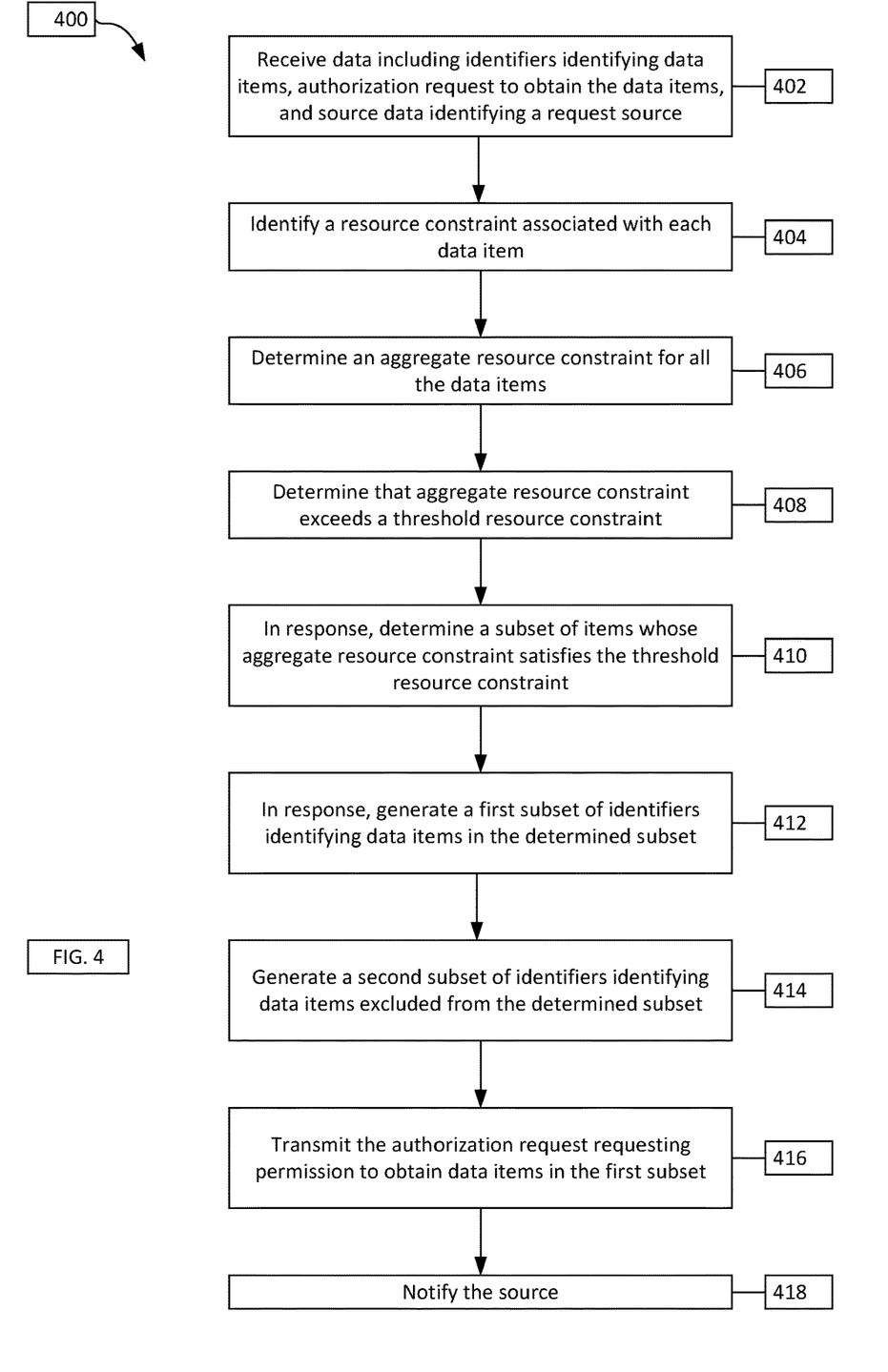
FIG. 4 is a flowchart of an example of a process to dynamically process requests for data items based on resource constraints using the computer system of FIG. 1.

FIG. 4 is a flowchart of an example of a process 400 to dynamically process requests for data items based on resource constraints using the computer system 100. At 402, the computer system 100 receives, through the user interface 104 displayed on the display device 102, data including multiple identifiers identifying respective multiple data items, authorization request to obtain the multiple data items identified by the multiple identifiers, and source data identifying a source from which the authorization request was received. To receive the data, the computer system 100 creates a new requisition and transmits a command to receive the data. An outbound adviser component of the computer system 100 receives the data and executes an API call for the data.

At 404, the computer system 100 identifies, using a resource constraint engine 106, a resource constraint associated with each data item of the multiple data items. At 406, the computer system 100 determines an aggregate resource constraint representing an aggregation (e.g., a summation) of the resource constraint identified for each data item of the multiple data items. At 408, the computer system 100 determines that the aggregate resource constraint determined for the multiple data items exceeds a threshold resource constraint associated with obtaining data items. For example, in response to determining that the threshold resource constraint has been exceeded, the computer system 100 can return an error message.

At 410, in response to determining that an aggregate of the source constraint associated with each data item in the subset satisfies the threshold resource constraint associated with obtaining data items, the computer system 100 determines a subset of the multiple data items. The subset includes fewer data items than the multiple data items received in the request. At 412, in response, the computer system 100 generates a first subset of the multiple identifiers identifying respective data items in the determined subset. At 414, the computer system generates a second subset of the multiple identifiers identifying respective data items excluded from the determined subset. At 416, the computer system transmits the authorization request to an authorization engine requesting permission to obtain the multiple data items in the first subset. At 418, in response to receiving the permission, the computer system transmits the permission, the first subset and the second subset to the source identified by the source data.

Figure 5:
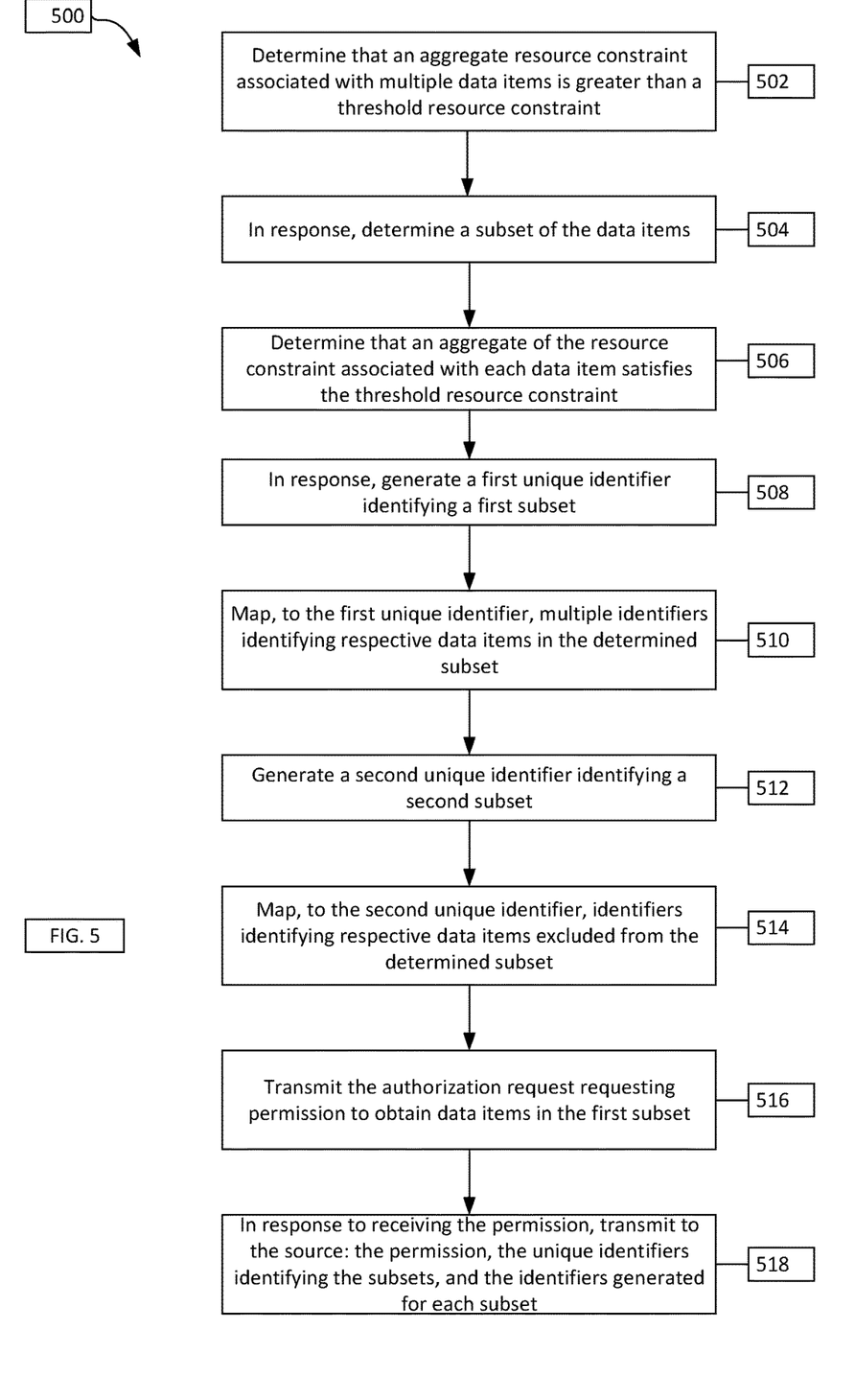
FIG. 5 is a flowchart of an example of a process to dynamically process requests for data items based on resource constraints using the computer system of FIG. 1.

FIG. 5 is a flowchart of an example of a process 500 to dynamically process requests for data items based on resource constraints using the computer system of FIG. 1. The process 500 can be implemented, for example, using the computer system 100. At 502, the computer system 100 determines that an aggregate resource constraint exceeds a threshold resource constraint. The threshold resource constraint is associated with obtaining data items. The aggregate resource constraint is associated with multiple data items received with an authorization request to obtain the multiple data items. The authorization request includes source data identifying a source from which the authorization request was received.

At 504, in response to determining that the aggregate resource constraint exceeds the threshold resource constraint, the computer system 100 determines a subset of the multiple data items. The subset includes fewer data items than the multiple data items received with the authorization request. At 506, the computer system 100 determines that an aggregate of the resource constraint associated with each data item in the subset satisfies the threshold resource constraint associated with obtaining data items. At 508, in response to doing so, the computer system 100 generates a first unique identifier identifying a first subset. At 510, the computer system 100 maps, to the first unique identifier, multiple identifiers identifying respective data items in the determined subset. At 512, the computer system 100 generates a second unique identifier identifying a second subset. At 514, the computer system maps, to the second unique identifier, identifiers identifying respective data items excluded from the determined subset. At 516, the computer system 100 transmits the authorization request to an authorization engine requesting permission to obtain the multiple data items in the first subset. At 518, in response to receiving the permission, the computer system 100 transmits, to the source identified by the source data, the permission, the first unique identifier generated for the first subset, the multiple identifiers mapped to the first unique identifier, the second unique identifier generated for the second subset, and the identifiers mapped to the second unique identifier.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   determining that an aggregate resource constraint associated with a plurality of data items received with an authorization request to obtain the plurality of data items exceeds a threshold resource constraint for obtaining data items, the authorization request comprising source data identifying a source from which the authorization request was received;
   in response to determining that the aggregate resource constraint exceeds the threshold resource constraint, determining a first subset of the plurality of data items that includes fewer data items than the plurality of data items received with the authorization request and for which an aggregate of resource constraints of data items in the first subset does not exceed the threshold resource constraint;
   in response to determining that the aggregate of resource constraints of data items in the first subset does not exceed the threshold resource constraint associated with obtaining data items:
      generating a first unique identifier identifying the first subset;
      mapping, to the first unique identifier, a plurality of identifiers identifying respective data items in the first subset;
      generating a second unique identifier identifying a second subset;
      mapping, to the second unique identifier, identifiers identifying respective data items excluded from the first subset;
      transmitting the authorization request to an authorization engine requesting permission to obtain the plurality of data items in the first subset; and
      in response to receiving the permission, transmitting, to the source identified by the source data:
         the permission,
         the first unique identifier generated for the first subset,
         the plurality of identifiers mapped to the first unique identifier,
         the second unique identifier generated for the second subset, and
         the identifiers mapped to the second unique identifier.

2. The method of claim 1, wherein the authorization request includes a plurality of rankings associated with the plurality of data items, wherein in response to determining that the aggregate resource constraint exceeds the threshold resource constraint, determining the first subset of the plurality of data items comprises selecting data items to include in the first subset based, in part, on the plurality of rankings associated with the plurality of data items.

3. The method of claim 2, wherein selecting data items to include in the first subset based, in part, on the plurality of rankings associated with the plurality of data items comprises selecting a data item with a higher ranking to include in the first subset in place of another data item with a comparatively lower ranking.

4. The method of claim 1, further comprising receiving, through a user interface displayed on a display device, data comprising a plurality of identifiers identifying the plurality of data items, the authorization request and the source data.

5. The method of claim 4, wherein the data received through the user interface displayed on the display device comprises a plurality of quantities associated with the plurality of data items, wherein in response to determining that the aggregate resource constraint exceeds the threshold resource constraint, determining the first subset of the plurality of data items comprises reducing a quantity of a data item and then selecting the data item associated with the reduced quantity to include in the first subset.

6. The method of claim 1, further comprising, in response to determining that the aggregate resource constraint determined for the plurality of data items exceeds the threshold resource constraint associated with obtaining data items:
  identifying a first data item from the plurality of data items, the first data item associated with a first resource constraint;
  determining, from a database of data items, an equivalent data item having substantially similar characteristics as the first data item, the equivalent data item having a reduced resource constraint compared to the first resource constraint;
  determining an identifier that identifies the equivalent data item; and
  providing, to the source, the identifier of the equivalent data item as an alternative to the first data item.

7. The method of claim 1, further comprising, in response to transmitting the authorization request to the authorization engine requesting permission to obtain the plurality of data items in the first subset, receiving, from the authorization engine, permission to obtain only the plurality of data items in the first subset and not the plurality of data items in the second subset.

8. The method of claim 7, wherein the source data identifying the source from which the authorization request was received comprises a past history of requests to obtain data items from the source, wherein generating the first subset of the plurality of identifiers comprises generating the first subset of the plurality of identifiers based, in part, on the past history of requests from the source.

9. A system comprising:
  one or more computers; and
  a computer-readable medium coupled to the one or more computers having instructions stored thereon which, when executed by the one or more computers, cause the one or more computers to perform operations comprising:
    determining that an aggregate resource constraint associated with a plurality of data items received with an authorization request to obtain the plurality of data items exceeds a threshold resource constraint for obtaining data items, the authorization request comprising source data identifying a source from which the authorization request was received;
    in response to determining that the aggregate resource constraint exceeds the threshold resource constraint, determining a first subset of the plurality of data items that includes fewer data items than the plurality of data items received with the authorization request and for which an aggregate of resource constraints of data items in the first subset does not exceed the threshold resource constraint;
    in response to determining that the aggregate of resource constraints of data items in the first subset does not exceed the threshold resource constraint associated with obtaining data items:
      generating a first unique identifier identifying the first subset;
      mapping, to the first unique identifier, a plurality of identifiers identifying respective data items in the first subset;
      generating a second unique identifier identifying a second subset;
      mapping, to the second unique identifier, identifiers identifying respective data items excluded from the first subset;
      transmitting the authorization request to an authorization engine requesting permission to obtain the plurality of data items in the first subset; and
    in response to receiving the permission, transmitting, to the source identified by the source data:
      the permission,
      the first unique identifier generated for the first subset,
      the plurality of identifiers mapped to the first unique identifier,
      the second unique identifier generated for the second subset, and
      the identifiers mapped to the second unique identifier.

10. The system of claim 9, wherein the authorization request includes a plurality of rankings associated with the respective plurality of items, wherein in response to determining that the aggregate resource constraint exceeds the threshold resource constraint, determining the first subset of the plurality of data items comprises selecting data items to include in the first subset based, in part, on the plurality of rankings associated with the plurality of data items.

11. The system of claim 10, wherein selecting data items to include in the first subset based, in part, on the plurality of rankings associated with the respective plurality of items comprises selecting a data item with a higher ranking to include in the first subset in place of another data item with a comparatively lower ranking.

12. The system of claim 9, wherein the operations further comprise receiving, through a user interface displayed on a display device, data comprising a plurality of identifiers identifying the plurality of data items, the authorization request and the source data.

13. The system of claim 12, wherein the data received through the user interface displayed on the display device comprises a plurality of quantities associated with the respective plurality of items, wherein in response to determining that the aggregate resource constraint exceeds the threshold resource constraint, determining the first subset of the plurality of data items comprises reducing a quantity of a data item and then selecting the data item associated with the reduced quantity to include in the first subset.

14. The system of claim 9, wherein the operations further comprise, in response to determining that the aggregate resource constraint determined for the plurality of data items exceeds the threshold resource constraint associated with obtaining data items:
  identifying a first data item from the plurality of data items, the first data item associated with a first resource constraint;
  determining, from a database of data items, an equivalent data item having substantially similar characteristics as the first data item, the equivalent data item having a reduced resource constraint compared to the first resource constraint;
  determining an identifier that identifies the equivalent data item; and
  providing, to the source, the identifier of the equivalent data item as an alternative to the first data item.

15. The system of claim 14, wherein the operations further comprise, in response to transmitting the authorization request to the authorization engine requesting permission to obtain the plurality of data items in the first subset, receiving, from the authorization engine, permission to obtain only the plurality of data items in the first subset and not the plurality of data items in the second subset.

16. A non-transitory computer-readable medium storing computer instructions executable by one or more computers to perform operations comprising:

determining that an aggregate resource constraint associated with a plurality of data items received with an authorization request to obtain the plurality of data items exceeds a threshold resource constraint for obtaining data items, the authorization request comprising source data identifying a source from which the authorization request was received;

in response to determining that the aggregate resource constraint exceeds the threshold resource constraint, determining a first subset of the plurality of data items that includes fewer data items than the plurality of data items received with the authorization request and for which an aggregate of resource constraints of data items in the first subset does not exceed the threshold resource constraint;

in response to determining that the aggregate of resource constraints of data items in the first subset does not exceed the threshold resource constraint associated with obtaining data items:

generating a first unique identifier identifying the first subset;

mapping, to the first unique identifier, a plurality of identifiers identifying respective data items in the first subset;

generating a second unique identifier identifying a second subset;

mapping, to the second unique identifier, identifiers identifying respective data items excluded from the first subset;

transmitting the authorization request to an authorization engine requesting permission to obtain the plurality of data items in the first subset; and in response to receiving the permission, transmitting, to the source identified by the source data:

the permission, the first unique identifier generated for the first subset, the plurality of identifiers mapped to the first unique identifier, the second unique identifier generated for the second subset, and the identifiers mapped to the second unique identifier.

17. The medium of claim 16, wherein the operations further comprise, in response to transmitting the authorization request to the authorization engine requesting permission to obtain the plurality of data items in the first subset, receiving, from the authorization engine, permission to obtain only the plurality of data items in the first subset and not the plurality of data items in the second subset.

18. The medium of claim 17, wherein the source data identifying the source from which the authorization request was received comprises a past history of requests to obtain data items from the source, wherein generating the first subset of the plurality of identifiers comprises generating the first subset of the plurality of identifiers based, in part, on the past history of requests from the source.

19. The medium of claim 16, the operations further comprising, in response to determining that the aggregate resource constraint determined for the plurality of data items exceeds the threshold resource constraint associated with obtaining data items:

identifying a first data item from the plurality of data items, the first data item associated with a first resource constraint;

determining, from a database of data items, an equivalent data item having substantially similar characteristics as the first data item, the equivalent data item having a reduced resource constraint compared to the first resource constraint;

determining an identifier that identifies the equivalent data item; and providing, to the source, the identifier of the equivalent data item as an alternative to the first data item.

20. The medium of claim 16, the operations further comprising, in response to transmitting the authorization request to the authorization engine requesting permission to obtain the plurality of data items in the first subset, receiving, from the authorization engine, permission to obtain only the plurality of data items in the first subset and not the plurality of data items in the second subset, wherein the source data identifying the source from which the authorization request was received comprises a past history of requests to obtain data items from the source, wherein generating the first subset of the plurality of identifiers comprises generating the first subset of the plurality of identifiers based, in part, on the past history of requests from the source.

* * * * *